US005799381A

United States Patent [19]

Gannon et al.

[11] Patent Number: 5,799,381

[45] Date of Patent: Sep. 1, 1998

[54] STUD NAIL PLIERS APPARATUS

[76] Inventors: Todd Edward Gannon, 424 32 Rd.,#7, Clifton, Colo. 81520; Troy Dan Russell, 2854 Texas Dr., Grand Jct., Colo. 81501

[21] Appl. No.: 587,307

[22] Filed: Jan. 16, 1996

[51] Int. Cl.[6] .................. B23P 19/04; B25B 7/02

[52] U.S. Cl. .................. 29/268; 29/270; 81/426.5; 254/22

[58] Field of Search .................. 81/421, 426.5, 81/424.5; 225/103; 29/270, 278, 268, 750; 8/52, 58; 30/191, 192, 193; 7/129, 130, 132, 133; 254/21, 22

[56] References Cited

U.S. PATENT DOCUMENTS

| | | | |
|---|---|---|---|
| D. 179,056 | 10/1956 | Bergan | D8/58 |
| D. 251,409 | 3/1979 | Smith . | |
| D. 297,802 | 9/1988 | Himbert et al. . | |
| D. 298,008 | 10/1988 | Kim . | |
| 608,358 | 8/1898 | Assorati | 81/421 |
| 819,439 | 5/1906 | Koch | 81/424.5 X |
| 1,069,106 | 8/1913 | Brice | 81/426.5 X |
| 1,388,398 | 8/1921 | Adams | 7/133 X |
| 1,661,365 | 3/1928 | Gendron | 81/426.5 X |
| 1,753,080 | 4/1930 | Zwilling et al. | 81/426.5 X |
| 1,911,429 | 5/1933 | Carroll | 81/421 |
| 2,387,928 | 10/1945 | Monnier | 81/426.5 |
| 2,594,363 | 4/1952 | Stephenson | 7/129 X |
| 2,629,114 | 2/1953 | Peterson | 81/426.5 X |
| 2,774,268 | 12/1956 | Kagan | 81/426.5 X |
| 2,990,735 | 7/1961 | Manning | 7/133 X |
| 3,092,152 | 6/1963 | Neff | 7/130 X |
| 3,273,238 | 9/1966 | Kuhbier | D8/52 X |
| 3,456,343 | 7/1969 | Breisch . | |
| 3,831,207 | 8/1974 | Boyajian | 7/133 X |
| 4,104,752 | 8/1978 | Amerein et al | 7/133 |
| 5,119,520 | 6/1992 | Finn . | |
| 5,168,592 | 12/1992 | Jee . | |

*Primary Examiner*—S. Thomas Hughes

[57] ABSTRACT

A stud nail pliers apparatus is provided for removing a stud nail attached to a body panel wherein the stud nail has a hemispherical head welded to the body panel. The stud nail pliers apparatus includes a pair of pliers assemblies each of which includes, in serial order, a handle portion, a pivotal portion, and a jaw portion. A pivotal connector is interconnected between the pivotal portions of the pair of pliers assemblies. Each of the jaw portions includes a respective distal portion which is distal to the pivotal connector. Each of the jaw portions includes a respective proximal portion which is proximal to the pivotal connector. Each of the jaw portions includes a respective top side and a respective bottom side. Each distal portion includes an upwardly and outwardly flaring half-well portion which includes a half-notch portion located at a respective bottom side of a respective jaw portion. Each half-well portion flares upwardly and outwardly from a respective half-notch portion toward a respective top side of a respective jaw portion. Each jaw portion tapers from a respective fulcrum portion at each respective bottom side of each proximal portion toward each respective distal portion, such that a proximal thickness of each jaw portion at a fulcrum portion is greater than a distal thickness of each jaw portion. In accordance with another aspect of the invention, a removable and replaceable half-well-containing portion is connected to each respective jaw base portion.

2 Claims, 4 Drawing Sheets

FIG 1
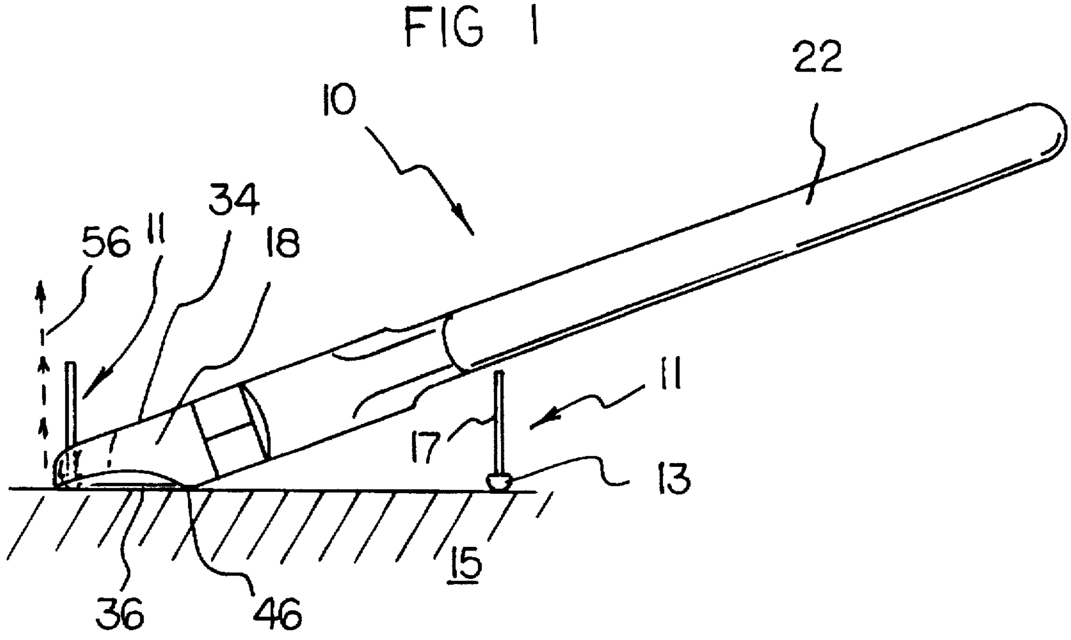
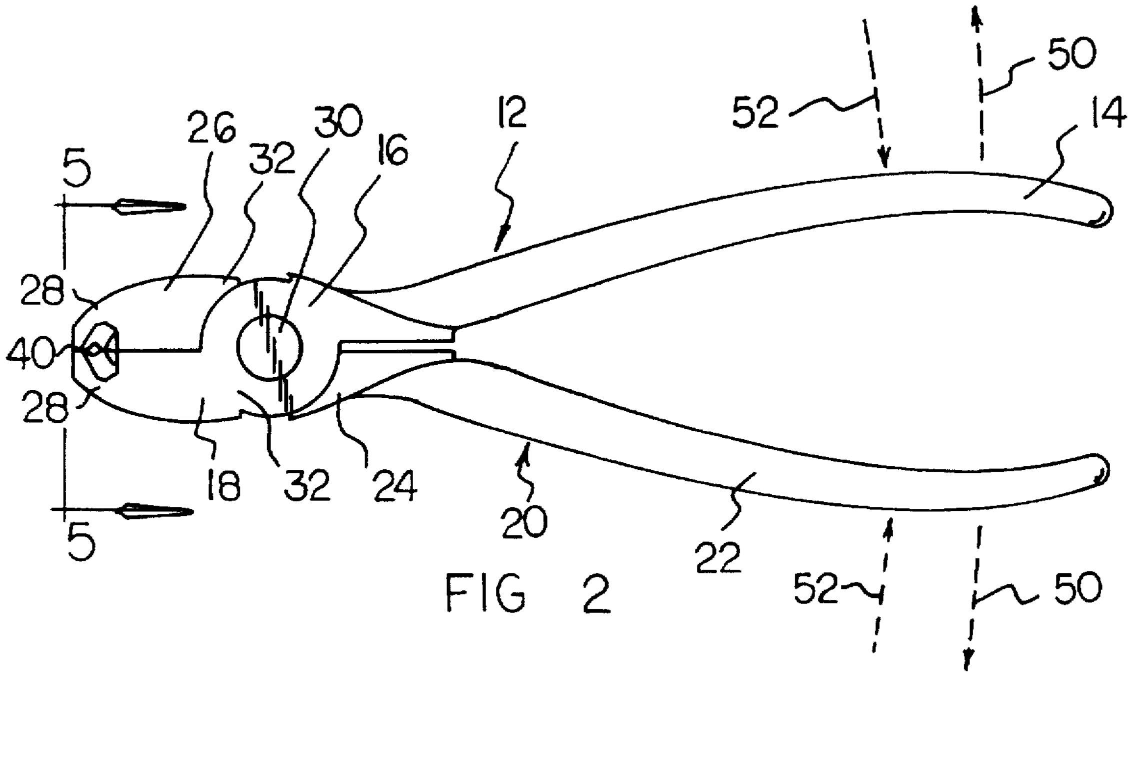
FIG 2

FIG 3
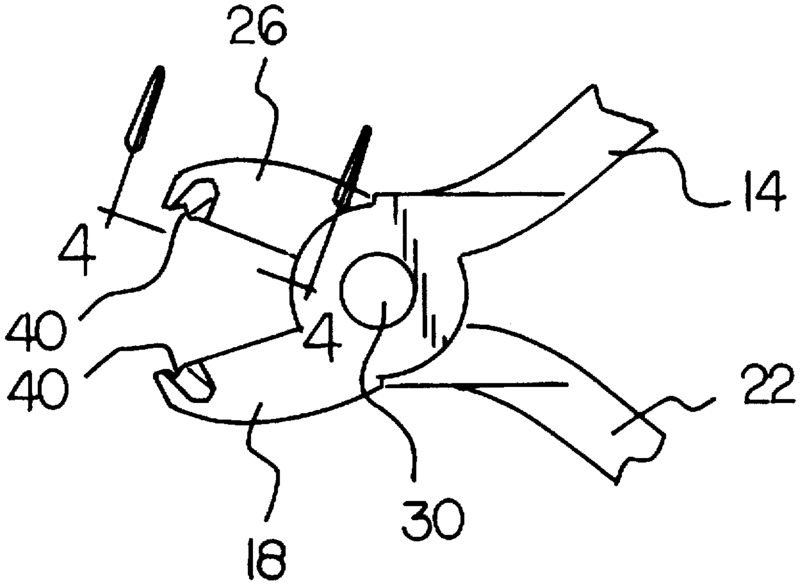
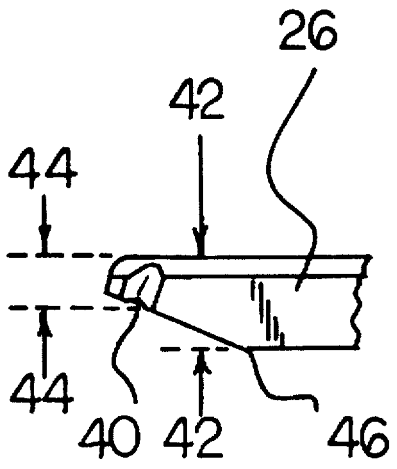
FIG 4
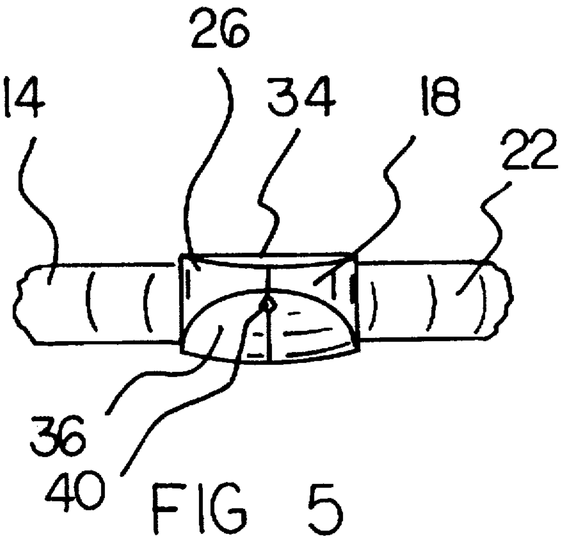
FIG 5

STUD NAIL PLIERS APPARATUS

BACKGROUND OF THE INVENTION

1. Field of the Invention

The present invention relates generally to hand tool devices and, more particularly, to pliers.

2. Description of the Prior Art

In the art of body and fender repairing, when a dent needs to be pulled out of a body panel, a stud nail is often welded to the body panel in the middle of the dent. The stud nail has a hemispherical head and a cylindrical portion projecting outwardly from the hemispherical head. The hemispherical head is welded to the body pane. After the hemispherical head of the stud nail is welded to the body panel, a pulling device is attached to the cylindrical portion of the stud nail, and the dent is pulled out. After the dent has been pulled out, the stud nail is removed by first cutting off the majority of the cylindrical portion of the stud nail and then grinding down the remainder of the cylindrical portion and the hemispherical head to form a smooth surface on the body panel. The grinding operation is undesirable for a number of reasons. The grinding operation is energy consuming, is time consuming, creates significant amounts of abrasive dust and stud nail particles, may cause undesirable heat to be generated by the grinding process, and requires the replacement of grinding materials which wear away. It is clear, then, for a number of important reasons, it would be desirable if a stud nail could be removed from a body panel without utilizing a significant grinding action. By precluding the use of a grinding action to remove a stud nail from a body panel, less energy is consumed, less time is consumed, abrasive dust is not generated, stud nail particles are not created, undesirable friction heat is not generated, and abrasive materials need not be replaced.

Moreover, when stud nails are removed from a body panel in the conventional way described above, the stud nail is destroyed in the process of removal. To prevent a waste of materials, it would be desirable if a stud nail could be removed from a body panel in such a way that the stud nail could be reused over again, perhaps many times.

In view of the above, it would be desirable if a simple hand tool were provided which enabled a person to readily remove a stud nail from a body panel without destroying the stud nail.

As a matter of interest, throughout the years, a number of innovations have been developed relating to pliers gripping tools or pliers-like cutting tools, and the following U.S. patents are representative of some of those innovations: U.S. Pat. Nos. 3,456,343; 5,119,520; 5,168,592; Des. 251,409; Des. 297,802; and Des. 298,008. It is noted that none of the above-cited patents is disclosed as being used for removing a stud nail from a body panel without destroying the stud nail. More specifically, a stud nail has a hemispherical head and a cylindrical portion projecting outward from the hemispherical head. To preserve the stud nail, it would be desirable if a hand tool were provided that enabled both the hemispherical head and cylindrical portion of a stud nail to be removed from a body panel without destroying the stud nail.

Still other features would be desirable in a hand tool that enables removal of a stud nail from a body panel without destroying the stud nail. For example, to separate the hemispherical head of the stud nail from the body panel, without destroying the stud nail, it would be desirable if a hand tool had one portion that slides partially under the hemispherical head of the stud nail and has another portion that provides leverage for lifting the stud nail off of the body panel.

Thus, while the foregoing body of prior art indicates it to be well known to use pliers for gripping and pliers-like cutting devices, the prior art described above does not teach or suggest a hand tool for a stud nail which has the following combination of desirable features: (1) provides that a stud nail can be removed from a body panel without utilizing a significant grinding action; (2) provides that a stud nail can be removed from a body panel in such a way that the stud nail can be reused over again, perhaps many times; (3) consumes less energy than a grinding operation; (4) consumes less time than a grinding operation; (5) does not generate abrasive dust; (6) does not generate stud nail particles; (7) does not generate undesirable friction heat; (8) does not require abrasive materials to be replaced; (9) enables a person to readily remove a stud nail from a body panel without destroying the stud nail; (10) enables both the hemispherical head and cylindrical portion of a stud nail to be removed from a body panel without destroying the stud nail; and (11) has at least one jaw portion including a groove disposed at an angle to a normal to the panel when the jaw engages a hemispherical head of the stud at the radiused weld contact thereof such that actuation of the plier apparatus of the present invention causes the welded stud to be lifted up and away from the panel to which it was formerly attached thereby facilitating easy and rapid removal of the welded stud from the body panel. The foregoing desired characteristics are provided by the unique stud nail pliers apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a stud nail pliers apparatus for removing a stud nail attached to a body panel wherein the stud nail has a hemispherical head welded to the body panel. The stud nail pliers apparatus includes a first pliers assembly which includes, in serial order, a first handle portion, a first pivotal portion, and a first jaw portion. A second pliers assembly includes, in serial order, a second handle portion, a second pivotal portion, and a second jaw portion. A pivotal connector is interconnected between the first pivotal portion and the second pivotal portion. Each of the first jaw portion and the second jaw portion includes a respective distal portion which is distal to the pivotal connector. Each of the first jaw portion and the second jaw portion includes a respective proximal portion which is proximal to the pivotal connector. Each of the first jaw portion and the second jaw portion includes a respective top side and a respective bottom side. Each distal portion includes an upwardly and outwardly flaring half-well portion which includes a half-notch portion located at a respective bottom side of a respective jaw portion. Each half-well portion flares upwardly and outwardly from a respective half-notch portion toward a respective top side of a respective jaw portion. Each jaw portion tapers from a respective fulcrum portion at each respective bottom side of each proximal portion toward each respective distal portion, such that a proximal thickness of each jaw portion at a fulcrum portion is greater than a distal thickness of each jaw portion. Preferably, the first handle portion and the second handle portion are complementary, and the first jaw portion and the second jaw portion are complementary.

In accordance with another aspect of the invention, each of the first jaw portion and the second jaw portion includes a jaw base portion. A removable and replaceable half-well-containing portion is connected to each respective jaw base portion. Each jaw base portion includes a groove, and each removable and replaceable half-well-containing portion includes a complementary tongue that is received by the groove.

In accordance with another aspect of the invention, a method is provided for removing a stud nail from a body panel, where the stud nail is connected to the body panel by a weld between a hemispherical head of the stud nail and the body panel. The method includes the steps of engaging the stud nail by a tool, operating the tool so that the tool exerts a pulling force on the stud nail away from the body panel in a direction perpendicular to the body panel, and breaking the weld between the hemispherical head of the stud nail and the body panel. The tool may engage the hemispherical head of the stud nail and pulls upward on the hemispherical head away from the body panel.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved stud nail pliers apparatus which has all of the advantages of the prior art and none of the disadvantages.

It is another object of the present invention to provide a new and improved stud nail pliers apparatus which may be easily and efficiently manufactured and marketed.

It is a further object of the present invention to provide a new and improved stud nail pliers apparatus which is of durable and reliable construction.

An even further object of the present invention is to provide a new and improved stud nail pliers apparatus which is susceptible of a low cost of manufacture with regard to both materials and labor, and which accordingly is then susceptible of low prices of sale to the consuming public, thereby making such stud nail pliers apparatus available to the buying public.

Still yet a further object of the present invention is to provide a new and improved stud nail pliers apparatus which provides that a stud nail can be removed from a body panel without utilizing a significant grinding action.

Still another object of the present invention is to provide a new and improved stud nail pliers apparatus that provides that a stud nail can be removed from a body panel in such a way that the stud nail can be reused over again, perhaps many times.

Yet another object of the present invention is to provide a new and improved stud nail pliers apparatus which consumes less energy.

Even another object of the present invention is to provide a new and improved stud nail pliers apparatus that consumes less time.

Still a further object of the present invention is to provide a new and improved stud nail pliers apparatus which does not generate abrasive dust.

Yet another object of the present invention is to provide a new and improved stud nail pliers apparatus that does not generate stud nail particles.

Still another object of the present invention is to provide a new and improved stud nail pliers apparatus which does not generate undesirable friction heat.

Yet another object of the present invention is to provide a new and improved stud nail pliers apparatus that does not require abrasive materials to be replaced.

Still a further object of the present invention is to provide a new and improved stud nail pliers apparatus that enables a person to readily remove a stud nail from a body panel without destroying the stud nail.

Yet another object of the present invention is to provide a new and improved stud nail pliers apparatus which enables both the hemispherical head and cylindrical portion of a stud nail to be removed from a body panel without destroying the stud nail.

Still a further object of the present invention is to provide a new and improved stud nail pliers apparatus that has one portion that slides partially under the hemispherical head of the stud nail and has another portion that provides leverage for lifting the stud nail off of the body panel.

Yet still another object of the present invention is to provide a new and improved stud nail pliers apparatus that has at least one jaw portion including a groove disposed at an angle to a normal to the panel when the jaw engages a hemispherical head of the stud at the radiused weld contact thereof such that actuation of the plier apparatus of the present invention causes the welded stud to be lifted up and away from the panel to which it was formerly attached thereby facilitating easy and rapid removal of the welded stud from the body panel.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a first embodiment of the stud nail pliers apparatus of the invention gripping a stud nail at the hemispherical head of the stud nail.

FIG. 2 is a top view of the embodiment of the stud nail pliers apparatus shown in FIG. 1 with the apparatus removed from the stud nail and the body panel.

FIG. 3 is a top view of a portion of the embodiment of the stud nail pliers apparatus of FIG. 2 showing its jaws in a open orientation.

FIG. 4 is a side view of a portion of a jaw shown in FIG. 3 taken along line 4—4.

FIG. 5 is a front view of a portion of a jaw shown in FIG. 3.

DESCRIPTION OF THE PREFERRED EMBODIMENT

Figure 3A:
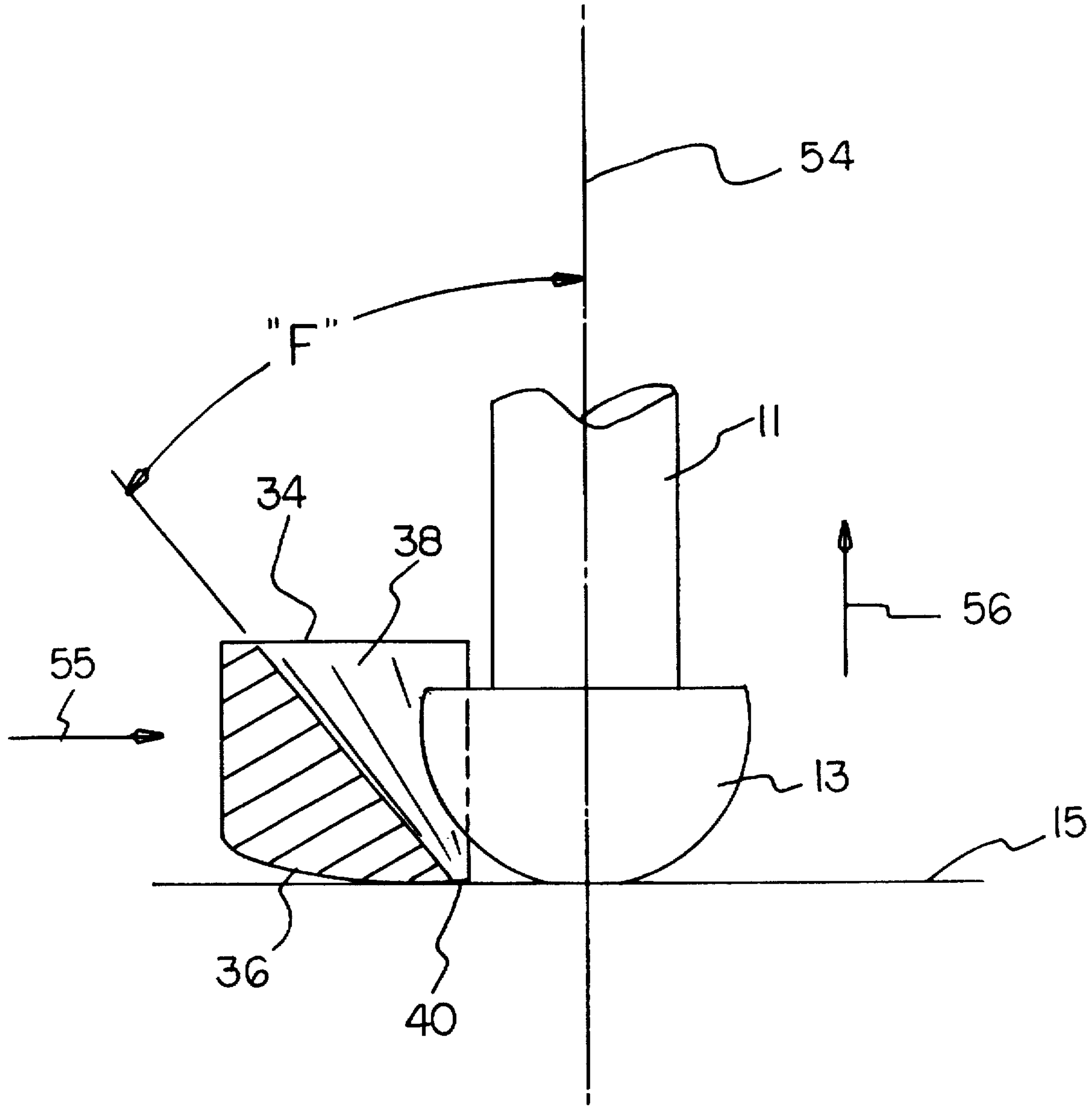
FIG. 3A is diagrammatic cross-sectional elevational view of one jaw of the pliers showing the angle the weld engaging half-well makes with a normal to the panel plane when the pliers are engaging a hemispherical shaped weld contact point.

With reference to the drawings, a new and improved stud nail pliers apparatus embodying the principles and concepts of the present invention will be described.

Turning to FIGS. 1–5 there is shown a first embodiment of the stud nail pliers apparatus of the invention generally designated by reference numeral 10. The stud nail pliers apparatus 10 is provided for removing a stud nail 11 attached to a body panel 15 wherein the stud nail 11 has a hemispherical head 13 welded to the body panel 15. The stud nail pliers apparatus 10 includes a first pliers assembly 12 which includes, in serial order, a first handle portion 14, a first pivotal portion 16, and a first jaw portion 18. A second pliers assembly 20 includes, in serial order, a second handle portion 22, a second pivotal portion 24, and a second jaw portion 26. A pivotal connector 30 is interconnected between the first pivotal portion 16 and the second pivotal portion 24. Each of the first jaw portion 18 and the second jaw portion 26 includes a respective distal portion 28 which is distal to the pivotal connector 30. Each of the first jaw portion 18 and the second jaw portion 26 includes a respective proximal portion 32 which is proximal to the pivotal connector 30. Each of the first jaw portion 18 and the second jaw portion 26 includes a respective top side 34 and a respective bottom side 36. Each distal portion 28 includes an upwardly and outwardly flaring half-well portion 38 which includes a half-notch portion 40 located at a respective bottom side 36 of a respective jaw portion. As shown in the drawings, the a half-notch portions 40 cooperate to form a through-extending aperture when the jaw portions 18 and 26 are abuttingly positioned together.

As best seen in the schematic diagram of FIG. 3A, each half-well portion 38 flares upwardly and outwardly from a respective half-notch portion 40 toward a respective top side 34 of a respective jaw portion by an angle defined herein as the "flare angle." In accordance with the present invention, the "flare angle" is measured with respect to a normal 54 to the panel 15 (i.e. in the case illustrated the normal is=to the axis of the stud nail), and is designated by the legend "F." The flare angle ("F") preferably is in the range of about 40 degrees to about 60 degrees, with an angle of about 50 degrees being particularly preferred.

Further, each jaw portion tapers from a respective fulcrum portion 46 at each respective bottom side 36 of each proximal portion 32 toward each respective distal portion 28, such that a proximal thickness 42 of each jaw portion at a fulcrum portion 46 is greater than a distal thickness 44 of each jaw portion. Preferably, the first handle portion 14 and the second handle portion 22 are complementary; and the first jaw portion 18 and the second jaw portion 26 are complementary.

In using the first embodiment of the stud nail pliers apparatus 10 of the invention, a stud nail 11 whose hemispherical head 13 is welded to a body panel 15 is selected. The cylindrical portion 17 of the stud nail 11 projects upward from the hemispherical head 13 generally perpendicular to the base panel. The first handle portion 14 and the second handle portion 22 of the stud nail pliers apparatus 10 are spread apart in the direction of broken arrows 50 (FIG. 2). This causes the first jaw portion 18 and the second jaw portion 26 to spread apart from each other. Each respective half-notch portion 40 is maneuvered with respect to the hemispherical head 13 of the selected stud nail 11 such that when the jaws are closed (arrow 55, FIG. 3A), the half-notch portions 40 wedge under the hemispherical head 13 of the stud nail 11. More specifically, the first handle portion 14 and the second handle portion 22 are squeezed together in the direction of broken arrows 52. When this occurs, the half-notch portions 40 of the first and second jaw portions are wedged under the hemispherical head 13 of the stud nail 11 and the hemispherical head 13 itself is surroundingly engaged by the half-well portions 38 of the respective jaw portions. It is noted that when the two half-well portion 38 are juxtaposed, they together form a full well which engages the round surfaces of the hemispherical head 13 of the stud nail 11 and because of the camming action of the "flare angle" wedges and/or lifts the hemispherical head 13 in the upward direction indicated by arrow(s) 56.

To further assist in removing the welded stud nail from panel 15 once the hemispherical head 13 is contained in the full well defined by the juxtaposed half-well portions 38, the first jaw portion 18 and the second jaw portion 26 may be twisted slightly left or right or up and down. As this is done, the hemispherical head 13 of the stud nail 11 is also pulled upward, away from the body panel 15 by the jaw portions and more particularly by the flared surface of the half-well portions 38 engagingly camming the hemispherical surface of the nail stud in the upward direction. In this regard, it is noted that the broken arrows 56 are oriented substantially perpendicular with respect to the body panel 15.

Thus, it will be appreciated that an important feature of the present invention resides in the provision of a pliers apparatus having at least one jaw portion including a half-well or groove disposed at a "flare angle" with respect to a normal to the panel when the jaw engages a hemispherical head of the stud at the radiused weld contact point thereof such that actuation of the plier apparatus causes the welded stud to be lifted up and away from the panel to which it was formerly attached thereby facilitating easy and rapid removal of the welded stud from the body panel.

By breaking the weld between the stud nail 11 and the body panel 15 with the plier apparatus of the present invention as described above, the stud nail 11 is left intact and can be used again. Smoothing down the residue left by the broken weld takes relatively little effort, and may require a relatively small amount of scraping, sanding, or grinding.

Figure 6:
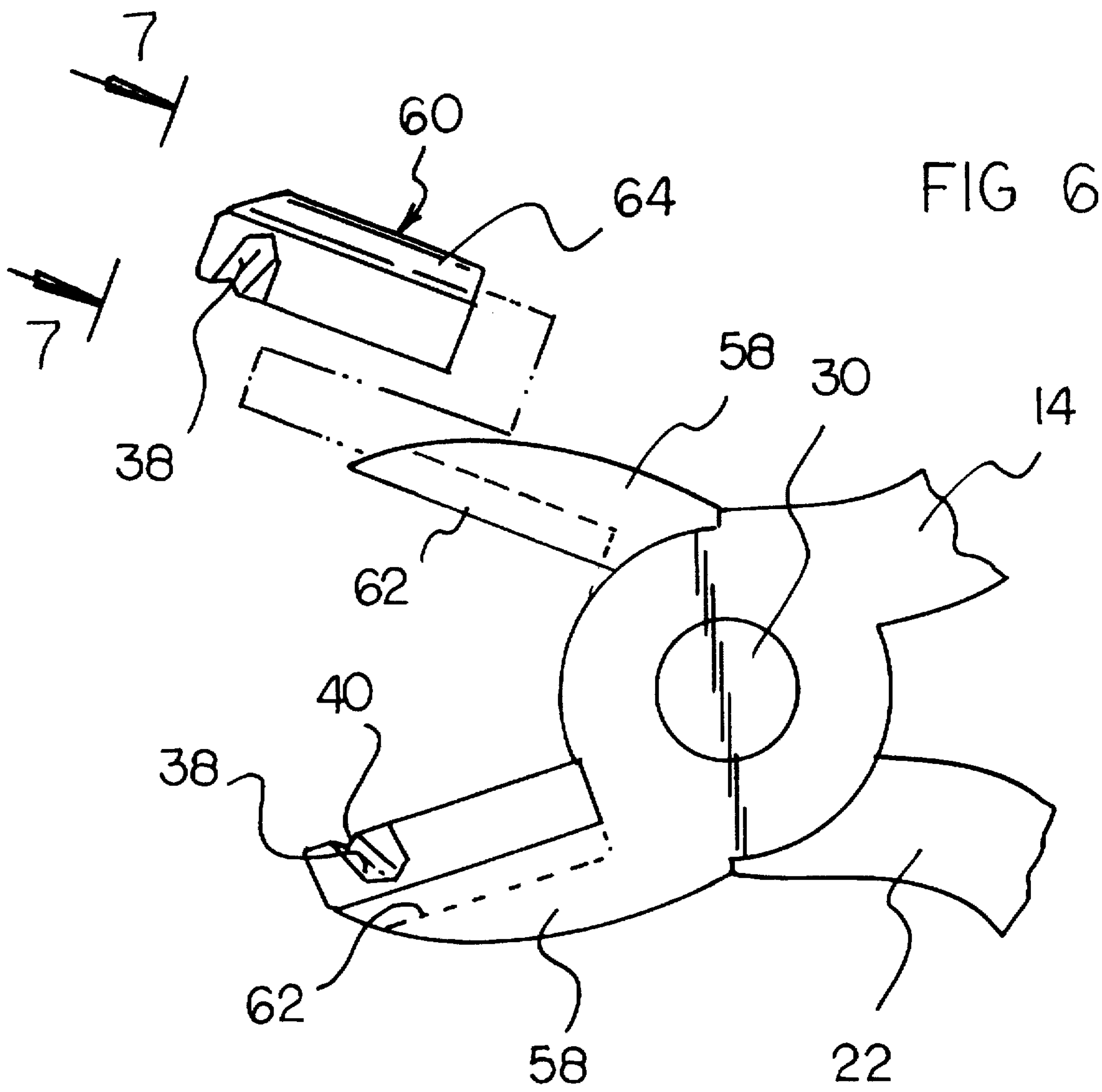
FIG. 6 is a partially exploded top view of a second embodiment of the invention which includes a removable and replaceable stud nail holder.
Figure 7:
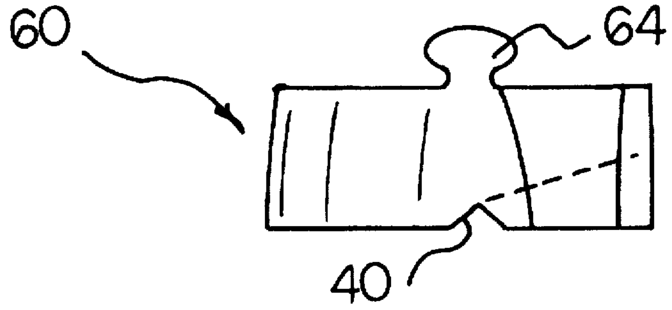
FIG. 7 is an enlarged front view of a removable and replaceable stud nail holder taken along line 7—7 of FIG. 6.

Turning to FIGS. 6 and 7, a second embodiment of the invention is shown. Reference numerals are shown that correspond to like reference numerals that designate like elements shown in the other figures. In addition, each of the first jaw portion 18 and the second jaw portion 26 includes a jaw base portion 58. A removable and replaceable half-well-containing portion 60 is connected to each respective jaw base portion 58. Each jaw base portion 58 includes a groove 62, and each removable and replaceable half-well-containing portion 60 includes a complementary tongue 64 that is received by the groove 62.

The second embodiment of the invention is used in substantially the same way as the first embodiment of the invention described above. The key difference is that, with the second embodiment of the invention, the tongues 64 can be pulled out of the grooves 62 to remove the removable and replaceable half-well-containing portions 60. The removable and replaceable half-well-containing portions 60 that are removed can be replaced by removable and replaceable half-well-containing portions 60 that have the same size half-notch portions 40 and the same size half-well portions 38 if the original removable and replaceable half-well-containing portions 60 are damaged or worn.

Alternatively, the removable and replaceable half-well-containing portions 60 can come as a set which have different size half-notch portions 40 and different size half-well portions 38. The different sizes of the half-notch portions 40 and the half-well portions 38 can be provided to accommodated stud nails 11 that have different sizes of hemispherical heads 13 and different sizes of the welds that are employed to attach the stud nails 11 to body panels 15.

In accordance with another aspect of the invention, it may be stated that a new method is provided for removing a stud nail 11 from a body panel 15. The method of removing a stud nail 11 from a body panel 15 is for a stud nail 11 that is connected to the body panel 15 by a weld between a hemispherical head 13 of the stud nail 11 and the body panel 15. The method of stud nail 11 removal includes the steps of engaging the stud nail 11 by a tool, operating the tool so that the tool exerts a pulling force on the stud nail 11 away from the body panel 15 in a direction perpendicular to the body panel 15, and breaking the weld between the hemispherical head 13 of the stud nail 11 and the body panel 15. Preferably, the tool engages the hemispherical head 13 of the stud nail 11 and pulls upward on the hemispherical head 13 away from the body panel 15.

The components of the stud nail pliers apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved stud nail pliers apparatus that is low in cost, relatively simple in design and operation, and which may advantageously be used to remove a stud nail from a body panel without utilizing a significant grinding action. With the invention, a stud nail pliers apparatus provides that a stud nail can be removed from a body panel in such a way that the stud nail can be reused over again, perhaps many times. With the invention, a stud nail pliers apparatus is provided which consumes less energy than a grinding operation for removing a stud nail from a body panel. With the invention, a stud nail pliers apparatus is provided which consumes less time than a grinding operation for removing a stud nail from a body panel. With the invention, a stud nail pliers apparatus is provided which does not generate abrasive dust. With the invention, a stud nail pliers apparatus is provided which does not generate stud nail particles. With the invention, a stud nail pliers apparatus is provided which does not generate undesirable friction heat. With the invention, a stud nail pliers apparatus is provided which does not require abrasive materials to be replaced. With the invention, a stud nail pliers apparatus is provided which enables a person to readily remove a stud nail from a body panel without destroying the stud nail. With the invention, a stud nail pliers apparatus is provided which enables both the hemispherical head and cylindrical portion of a stud nail to be removed from a body panel without destroying the stud nail. With the invention, a stud nail pliers apparatus is provided which has one portion that slides partially under the hemispherical head of the stud nail and has another portion that provides leverage for lifting the stud nail off of the body panel. With the invention, a stud nail pliers apparatus is provided which has at least one jaw portion including a half-well or groove disposed at a "flare angle" with respect to a normal to the panel when the jaw engages a hemispherical head of the stud at the radiused weld contact point thereof such that actuation of the plier apparatus causes the welded stud to be lifted up and away from the panel to which it was formerly attached thereby facilitating easy and rapid removal of the welded stud from the body panel.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A stud nail pliers apparatus for removing a stud nail having a hemispherical head welded to a body panel, comprising:

a pliers assembly including first and second handle portions pivotally connected together, and first and second jaw portions, with the first and second jaw portions each including top and bottom sides, the first and second jaw portions each further including an upwardly and outwardly flaring half-well portion which includes a half-notch portion located at a respective bottom side of the respective jaw portion, and wherein each half-well portion flares upwardly and outwardly from a respective half-notch portion toward a respective top side of a respective jaw portion;

wherein the half-notch portions cooperate to define an aperture extending completely through the jaw portions when the jaw portions are abuttingly positioned together about a hemispherical head of a stud nail, whereby the stud nail can project completely through the aperture and beyond the jaw portions, wherein the first and second handle portions reside within a plane and the bottom side of the jaw portions extend at an angle relative to the plane, with the aperture formed by the half-notch portions extending substantially orthogonally from the bottom sides of the jaw portions and at an angle relative to the plane, whereby a stud nail orthogonally projecting from a surface can be grasped by the jaw portions with the handles extending at an angle relative to the surface when the bottom sides are abuttingly positioned against the surface, and further in combination with a surface, and a stud nail having a hemispherical head, the hemispherical head being coupled to the surface such that the stud nail orthogonally projects from the surface;

wherein the jaw portions are positioned about and engaged against opposed sides of the hemispherical head such that the stud nail projects completely through the aperture and beyond the jaw portions, with the bottom sides of the jaw portions being abuttingly positioned against the surface such that a manual biasing of the handle portions towards the surface will cause a distal end of the jaw portions to pivot away from the surface to de-couple the hemispherical head from the surface and allow removal of the stud nail.

2. The apparatus of claim 1 wherein said first jaw portion and said second jaw portion are complementary.

* * * * *